United States Patent [19]

Ito

[11] Patent Number: 5,729,749

[45] Date of Patent: Mar. 17, 1998

[54] EXCLUSIVE CONTROL SYSTEM FOR SHARED RESOURCE

[75] Inventor: Atsuki Ito, Aichi, Japan

[73] Assignee: Fujitsu Ltd., Kawasaki, Japan

[21] Appl. No.: 684,907

[22] Filed: Jul. 25, 1996

[30] Foreign Application Priority Data

Sep. 29, 1995 [JP] Japan ................................. 7-254129

[51] Int. Cl.[6] .................................................. G06F 13/14
[52] U.S. Cl. ........................ 395/726; 395/727; 395/477; 395/288; 395/474
[58] Field of Search ................................. 395/726, 288, 395/490, 477, 472, 727, 474

[56] References Cited

U.S. PATENT DOCUMENTS 5,440,743   8/1995   Yokota et al. .

Primary Examiner—Jack B. Harvey
Assistant Examiner—Rupal D. Dharia
Attorney, Agent, or Firm—Staas & Halsey

[57] ABSTRACT

An exclusive control system of a shared resource in the computer system is comprised of: an exclusive control management table constructed of a lock word and a lock queue header, a management region allocated to the respective executable members for storing therein the executable member identifying information of the allocated executable member; resource management means for swapping a content of a management region allocated to a requesting executable member for a content of the lock queue header of the exclusive control management table upon receipt of the request to acquire the use right of the shared resource from the executable member, or a request to release the use right from the executable member, thereby producing a quasi-queue for chaining the executable members that have requested to acquire the use right while another executable member acquires the use right; and executable member control means for suspending a process operation of such an executable member which is brought into a waiting state in order to acquire the use right of the shared resource, and for restarting the process operation of the executable member when the executable member under waiting state has acquired the use right.

6 Claims, 12 Drawing Sheets

FIG. 6

| LOCK WORD | 0 |
|---|---|
| LOCK QUEUE HEADER | NULL |
| SECONDARY QUEUE | NULL |
| QUEUE END VALUE | NULL |

1

EXCLUSIVE CONTROL SYSTEM FOR SHARED RESOURCE

BACKGROUND OF THE INVENTION

1. Field of the Invention

The present invention relates to an exclusive control system for a shared resource, in which a high-speed suspend lock is realized in a computer system capable of performing a swap process.

2. Prior Art

In a computer for initiating a plurality of executable members in a parallel manner, there is provided a shared resource that can be commonly used by the respective executable members. Then, when the shared resource is used, each of these executable members acquires a right by which the shared resource can be exclusively used (will be referred to as "use right" hereinafter), and thereafter uses the shared resource. It should be noted that an "executable member" described in this specification represents a task, a thread, and so on.

Conventionally, the busy/wait method such as a spin lock has been utilized as a method for exclusively controlling the shared resource. However, this busy/wait method owns such a problem that since the loop process operation is required to carry out the waiting process operation of the use right, the CPU is operated under useless state.

When a competition occurs among executable members whose executable priority orders are different from each other so as to acquire the use right, there is a risk that a secondary dead lock occurs. That is, for instance, while an executable member whose execution priority order is low has acquired a use right, when an executable member whose execution priority order is high will issue a request to acquire a use right, the spin loop process operation is permanently continued during the process operation for acquiring the use right by the executable member whose execution priority order is high. Accordingly, there is a risk that the secondary dead lock occurs.

To solve the above-described problem, there is a so-called "suspend lock" process. In this suspend lock process operation, the process operation of the executable member for waiting for the use right is suspended, so that the CPU may be released from this process operation. Then, the executable member for releasing the use right restarts the process operation of the waiting executable member, whereby the CPU resource is again allocated to the executable member under waiting state, and then the process operation of this executable member under waiting state is restarted.

According to this suspend lock method, there is a merit that when the executable member is under waiting condition, the CPU is released from the process operation of this executable member, so that the CPU resource is not consumed under useless condition.

On the other hand, in the above-described suspend lock method, when the executable member for releasing the use right transfers the use right to the executable member under waiting state, the use right queue for judging such an executable member to whom the use right should be transferred is required. To form this queue, the specific serialized instructions such as compare swap instructions are utilized, and also the interrupt prohibit process operation is used. As a consequence, there is a problem that the suspend lock could not be realized unless the specific serialized instructions such as the compare swap instructions are prepared.

SUMMARY OF THE INVENTION

Therefore, an object of the present invention is to provide a technique capable of realizing a suspend lock in a computer capable of atomically performing a swapping process operation even if this computer is not provided with a specific serialized instructions.

To achieve the above-described object, an exclusive control system of a shared resource, according to the present invention, is comprised of an exclusive control management table, a management region allocated to the respective executable members, resource management means, and executable member control means.

The exclusive control table is constructed of a lock word and a lock queue header. The lock word stores therein executable member identifying information for specifying an executable member that has acquired a use right of the shared resource, and the lock queue header stores therein the executable member identifying information of such an executable member that has finally requested to acquire the use right of the shared resource among the executable members that have requested to acquire the use right while other executable member acquires the use right.

The management region is a storage region allocated to the respective executable members, and then the executable member identifying information of the allocated executable member is stored in the respective storage regions.

In this case, when the use right of the shared resource is under empty condition, the initial value is set to the lock word. Then, when a certain executable member has acquired the use right of the shared resource, the executable member identifying information of this executable member is set. Furthermore, the lock word is reset when the executable member that has acquired the use right releases the use right. At this time, if there is an executable member that has waited for such a condition that the use right becomes empty, then the executable member identifying information of this executable member is written.

In the case that the use right of the shared resource is under empty state, the initial value has been set to the lock queue header. Then, when a certain executable member issues a request to acquire a use right, the initial value is swapped by the value of the management region allocated to this certain executable member (swapping process operation). For instance, in the case that the use right is under empty state and also the initial value has been set to the lock queue header, when the request to acquire a use right is issued from a certain executable member A, the executable member identifying information "A" set to the management region allocated to this executable member A is replaced by the initial value of the lock queue header. Then, while the executable member A acquires the use right, when another request to acquire the use right is issued from an executable member B, the executable member identifying information "B" set to the management region allocated to the executable member B is swapped for the value "A" of the lock queue header. At this time, the executable member identifying information "B" is set to the lock queue header, whereas the executable member identifying information "A" is set to the management region of the executable member B. Furthermore, when a request to acquire the use right is issued from an executable member C, the value "B" of the lock queue header is swapped for the executable member identifying information "C" set to the management region allocated to the executable member C. At this time, the executable member identifying information "C" is set to the lock queue header, the executable member identifying information "B" is set to the management region of the executable member C, and furthermore, the executable member identifying information "A" is set to the management region of the executable member B. As described above, the swapping process operation between the lock queue header and the management region is performed, so that chaining of the lock queue header via the executable member C to the executable member B occurs, which may be used as the quasi-unidirectional queue.

Then, as previously explained, upon receipt of the request to acquire the use right, the resource management means executes the swapping process (swapping process operation) to thereby produce the quasi-queue. Also, upon receipt of the request to release the use right, the resource management means transfers the user right by utilizing the queue.

The executable member control means suspends the process operation of the executable member under waiting condition. Then, when the use right is transferred to the executable member under waiting condition, the executable member control means restarts the process operation of this executable member. This executable member control means owns, for instance, the state management tables with respect to the respective executable members, and rewrites the state identifying information of the state management table, so that the process operation can be suspended, or the process operation can be restarted.

Upon receipt of the request to acquire the use right issued from the executable member, the above-explained resource management control means swaps the executable member identifying information set to the management region allocated to this executable member for the value stored in the lock queue header of the exclusive control management table. Then, the resource management means judges as to whether or not there is such an executable member under waiting state by judging as to whether or not the swapped value of the management region is equal to the initial value of the lock queue header. In other words, when the initial value of the lock queue header is set to the management region after the swap, it is judged that there is no executable member under waiting state. On the other hand, when the executable member identifying information of another executable member is set to the management region after the swap, it is judged that there is the executable member under waiting condition. In this case, the resource management means requests the executable member control means to suspend the process operation of the requesting executable member, so that the requesting executable member is brought into the waiting condition.

In the case that there is no executable member under waiting condition, the resource management means judges whether or not the use right is under empty state with reference to the value of the lock word. Now, if the initial value is set to the lock word, then it is judged that the use right is under empty state. Then, the executable member identifying information of the requesting executable member is stored into the lock word. As a result, the requesting executable member may have acquired the use right of the shared resource.

If the executable member identifying information of another executable member is stored into the lock word, then it is judged that another executable member is under use-right acquiring state. Then, the requesting executable member is brought into the waiting state by suspending the process operation. Concretely speaking, such a case that the initial value is set to the lock queue header and also the executable member identifying information of another executable member is stored into the lock word corresponds to a case where an interrupt is performed while executing the process operation to release the use right of another executable member (namely, after the lock queue header is reset, and before the lock word is reset).

Now, a description will be made of a sequence to release the use right according to the present invention.

The resource management means swaps, upon receipt of a request to release the use right issued from an executable member that has acquired the use right of the shared resource, a value stored in a management region allocated to the executable member for the value stored in the lock queue header. Then the resource management means judges as to whether or not the swapped value of the management region indicates the executable member identifying information of the executable member, and resets the lock word when the swapped value of the management region indicates the executable member identifying information of the executable member. On the other hand, the resource management means judges that an executable member under waiting condition is present when the swapped value of the management region indicates the executable member identifying information of other executable member, and also sets the executable member identifying information of another executable member to the lock word. Furthermore, the resource management means requests the executable member control means to restart the process operation the another executable member, and also judges as to whether or not the value of the management region allocated to the executable member whose process operation is restarted indicates the executable member identifying information of the executable member for requesting the release of the use right. Also, the resource management means judges, when the value of the management region allocated to the executable member whose process operation is restarted indicates the executable member identifying information for requesting the release of the use right, that the executable member whose process operation is restarted corresponds to such an executable member that has firstly requested to acquire the use right among the executable members under waiting condition, and judges, when the value of the management region allocated to the executable member whose process operation is restarted indicates the executable member identifying information of such an executable member different from the executable member for requesting the release of the use right, that there is another executable member that has requested to acquire the use right before the above executable member whose process operation is restarted.

In the above-described flow operation, when the interrupt request to acquire the use right is issued while performing the process operation to release the use right of another executable member (namely, after the lock queue header is reset, and before the lock word is reset), there is a risk that the requesting executable member is permanently brought into the waiting state (i.e., dead lock state). To avoid such a risk, according to the present invention, the below-mentioned means are employed in this invention.

That is, the exclusive control management table further comprises a lock transfer region for requesting therein the executable member identifying information of the executable member that has requested to acquire the use right while executing the process operation to release the use right. Then, the resource management means judges, when the process operation to release the use right is accomplished, as to whether or not there is an executable member that has requested to acquire the use right while performing the process operation to release the use right with reference to the lock transfer region, and also requests the executable member control means to restart the process operation of said executable member if there is the executable member that has requested to acquire the use right.

The resource management means judges, when the process operation to release the use right is accomplished, as to whether an initial value has been set, or the executable member identifying information has been set by again referring to the lock queue header of the executable control table. Then, the resource management means judges that there is the executable member that has requested to acquire the use right while performing the process operation to release the use right when the executable member identifying information is set to the lock queue header, and also requests the executable member control means to restart the process operation of the executable member specified by the executable member identifying information.

The resource management means executes the process operation to release the use right by way of an interrupt prohibit process operation.

BRIEF DESCRIPTION OF THE DRAWINGS

For a better understanding of the present invention, reference is made of detailed descriptions to be read in conjunction with the accompanying drawings, in which:

FIG. 6 represents an arrangement of an exclusive control management table employed in a computer system according to embodiment 2 of the present invention;

DETAILED DESCRIPTION OF THE PREFERRED EMBODIMENT

Referring now to drawings, a description will be made of a shared resource exclusive control system according to various embodiments of the present invention.

Embodiment 1

A functional arrangement of a computer system capable of realizing a shared resource exclusive control system will now be explained with reference to FIG. 1.

Figure 1:
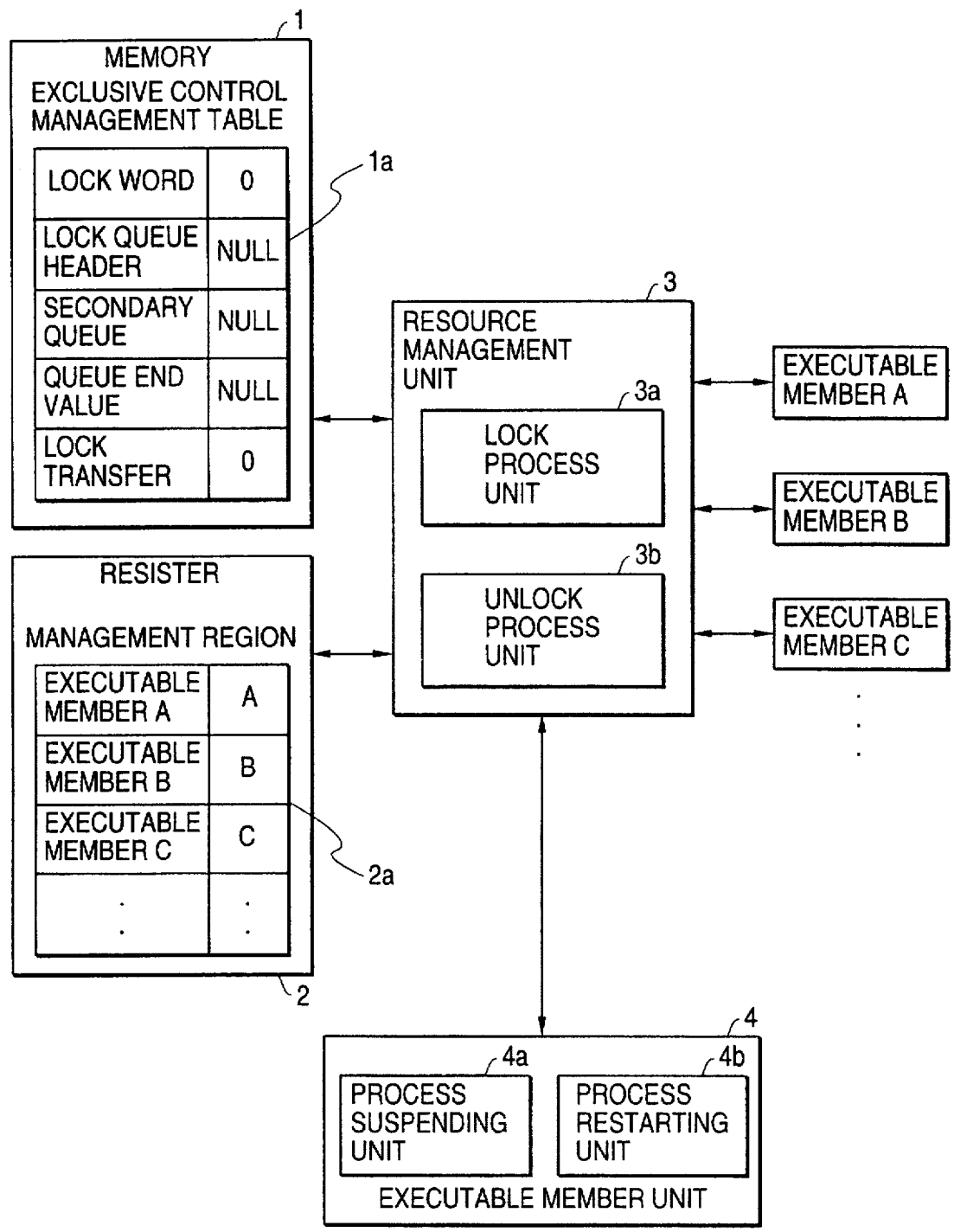
FIG. 1 is a functional diagram for representing an arrangement of a computer system according to embodiment 1 of the present invention.

The computer system shown in FIG. 1 corresponds to a system capable of executing a plurality of executable members in a parallel form, and also having a swap process function. It should be noted that a swap process function is realized as one swap instruction (command) of a machine language used in a computer system. When the swap instruction is executed, values mutually stored between a memory and register, between a register and another register, or between a memory and another memory are swapped with each other in response to a designation made by an operand. When an interrupt is issued to the computer system under execution of one machine language instruction, a process operation for this interrupt is executed after the process operation for the machine language instruction under execution has been complete. As a result, even when the interrupt is issued while executing the swap instruction, the swap process, namely the exchange of the values is performed in a complete form. Apparently, in the case that the interrupt is issued before the execution of the swap instruction, the values are not exchanged, or swapped.

Then, the computer system is comprised of an exclusive control management table 1a set into a memory 1 of the computer, a management region 2a set into a register 2, a resource management unit 3 realized by the execution of a program by a CPU of the computer, and an executable member control unit 4 similarly realized by the execution of the program by the CPU.

In the exclusive control management table 1a, a lock word region, a lock queue header region, a secondary queue region, a queue end value region, and a lock transfer region are set. In the lock word region, an executable member ID of such an executable member that has acquired a use right of a shared resource is stored. Also, when the use right of the shared resource is under empty state, an initial value "0" is set into the lock word region.

Under initial state, the lock queue header region registers therein an initial value "NULL." When a request to acquire a use right of a shared resource is issued from a certain executable member, a value of the management region 2a which is allocated to this executable member (i.e, executable member ID of requesting executable member) is swapped for this value of lock queue header region (initial value "NULL"), and then the executable member ID of the requesting executable member is stored into the lock queue header region. Furthermore, while a certain executable member acquires the use right of the shared resource, when another request to acquire a use right is issued from another executable member, a value of the management region 2a which is allocated to another executable member (namely, executable member ID of another executable member) is swapped for this value of the lock header queue region (namely, executable member ID of executable member that has acquired use right), and then the above-described executable member ID of another executable member is stored in the lock queue header region. As described above, while a certain executable member acquires a use right, when the request to acquire the use right is issued from another executable member, the value of the lock queue header region is successively updated. As a consequence, the executable member ID of the executable member that has finally requested to acquire the use right is stored into the lock queue header region, and the executable member ID of the executable member that has requested to acquire the use right just before the finally requesting executable member is stored into the management region 2a allocated to this executable member. Moreover, the executable member ID of the executable member that has requested to acquire the use right two before the finally requesting executable member is stored into the management region 2a allocated to the executable member that has requested to acquire the use right two before the finally requesting executable member. Accordingly, the executable members defined from the executable member that has finally requested to acquire the use right up to the executable member that has firstly requested to acquire the use right may be handled as a quasi-unidirectional queue (will be referred to as a "primary queue" hereinafter) with reference to the values stored in the lock queue header region.

It should be understood that the primary queue is directed to such an executable member that has requested to acquire the use right while one executable member acquires the use right, and the primary queue is dequeued in a batched mode at a time instance when the use right is transferred to another executable member. In other words, since the value of the lock queue header region is reset to the initial value "NULL" when the use right is transferred to another executable member, the connection between the lock queue header region and the primary queue is disconnected (queue dequeued in batched mode will be referred to as an "secondary queue" hereinafter).

The executable member ID of the executable member that has finally requested to acquire the use right among the secondary queues is stored into the secondary queue region.

When a certain executable member has acquired the use right, the executable member ID of this executable member is set to the queue end value.

A plurality of management regions 2a are set to the register 2. Then, the respective management regions 2a are allocated to the respective executable members, and are such management regions to which only the allocated executable members can access. Then, the executable member IDs for specifying the allocated executable members are stored into the respective regions.

The resource management unit 3 is arranged by a lock process unit 3a and an unlock process unit 3b.

The lock process unit 3a swaps the content of the memory 1 for the content of the register 2 upon receipt of the request to acquire the use right of the shared resource from the executable member, and then controls whether the use right is given to the requesting executable member, or the requesting executable member is coupled to the primary queue.

The unlock process unit 3b swaps the content of the memory 1 for the content of the register 2 upon receipt of the request to release the use right from the executable member that has acquired the use right, and then releases the use right. At this time, if there is the primary queue, then this primary queue is changed into the secondary queue.

Figure 2:
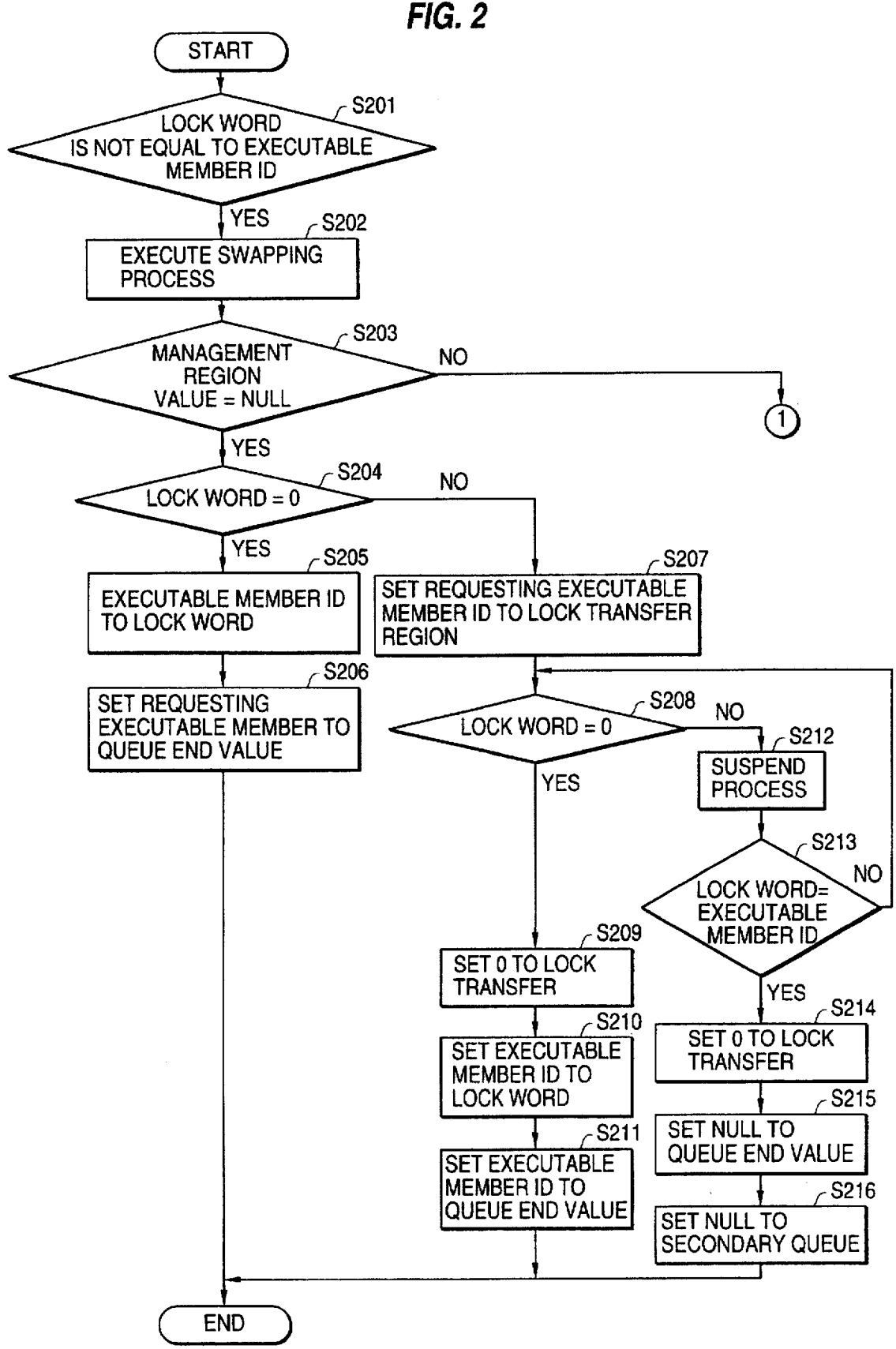
FIG. 2 is a flowchart for showing a process operation to acquire a use right.

Now, the process operation of the lock process unit 3a will be explained with reference to a flow operation of FIG. 2.

When the request to acquire the use right of the shared resource issued from a certain executable member together with the executable member ID of this executable member is received therefrom, the lock process unit 3a reads out the value of the lock word region from the exclusive control management table 1a of the memory 1. Then, the lock process unit 3a compares the read lock word value with the received executable member ID to thereby avoid to be acquired the use right in duplicate by a single executable member (step S201).

In this case, the lock process operation is continued only when the lock word value is not coincident with the executable member ID. That is, the value (executable member ID) of the management region 2a is swapped for the value of the lock queue header region of the exclusive control management table 1a (step S202).

Subsequently, the lock process unit 3a judges as to whether or not the value of the management region 2a after the swapping operation corresponds to the initial value "NULL" of the lock queue header region (step S203).

Now, if the initial value of the lock queue header region is "NULL", then it is judged that there is no primary queue. Then, the lock process unit 3a judges as to whether or not the value of the lock word region of the exclusive control management table 1a is equal to "0" (step S204).

If the value of the lock word region is equal to "0", it is judged that the use right is under empty state. Then, the lock process unit 3a sets the executable member ID of the requesting executable member to the lock word region (step S205).

Since neither the primary queue nor the secondary queue is present at this time, the executable member ID of the requesting executable member is written into the queue end value region (step S206).

As a consequence, the requesting executable member has acquired the use right of the shared resource.

When the value of the lock word region is not equal to the initial value "0" at the above-described step S204, namely the request to acquire the use right issued from the executable member corresponds to an interrupt process issued while processing the release of the use right by another executable member, the executable member ID of the requesting executable member is set to a lock transfer region of the exclusive control management table 1a (step S207), and then the process operation of the requesting executable member is suspended.

Then, in the process operation to release the use right of another executable member, since the value of the lock word region is rewritten into the initial value "0" and thereafter the lock transfer region is referred to, if the executable member ID of the requesting executable member is stored into this lock transfer region, then the process operation of the requesting executable member can be restarted.

Thus, when the process operation of the requesting executable member is restarted, a judgment is made as to whether or not the executable member ID of the requesting executable member is set with reference to the value of the lock word region (step S208). In this case, when the executable member ID of the requesting executable member is set to the value of the lock word region, the lock word region is reset to "0" (step S209), and the executable member ID of the requesting executable member is set to the lock word region (step S210). Furthermore, the executable member ID of the requesting executable member is also set to the queue end value (step S211). As a result, the requesting executable member has acquired the use right of the shared resource.

When at the above-described step S208, the executable member ID of the requesting executable member has not yet been set to the value of the lock word region, the executable member control unit 4 is requested to suspend the process operation of the requesting executable member (step S212). Thereafter, when the process operation of the requesting executable member is restarted, it is judged whether or not the value of the lock word region corresponds to the executable member ID of the executable member whose process operation is restarted (step S213). If the value of the lock word region is made coincident with the executable member ID of the executable member whose process operation is restarted, then the lock transfer region is reset to "0" (step S214), and the queue end value is reset to "NULL" (step S215), and furthermore the secondary queue region is reset to "NULL" (step S216).

Also, if the value of the lock word region is not coincident with the executable member ID of the executable member whose process operation is restarted at the step S213, then the process operations defined after the above-explained step S208 are repeatedly performed.

Figure 3:
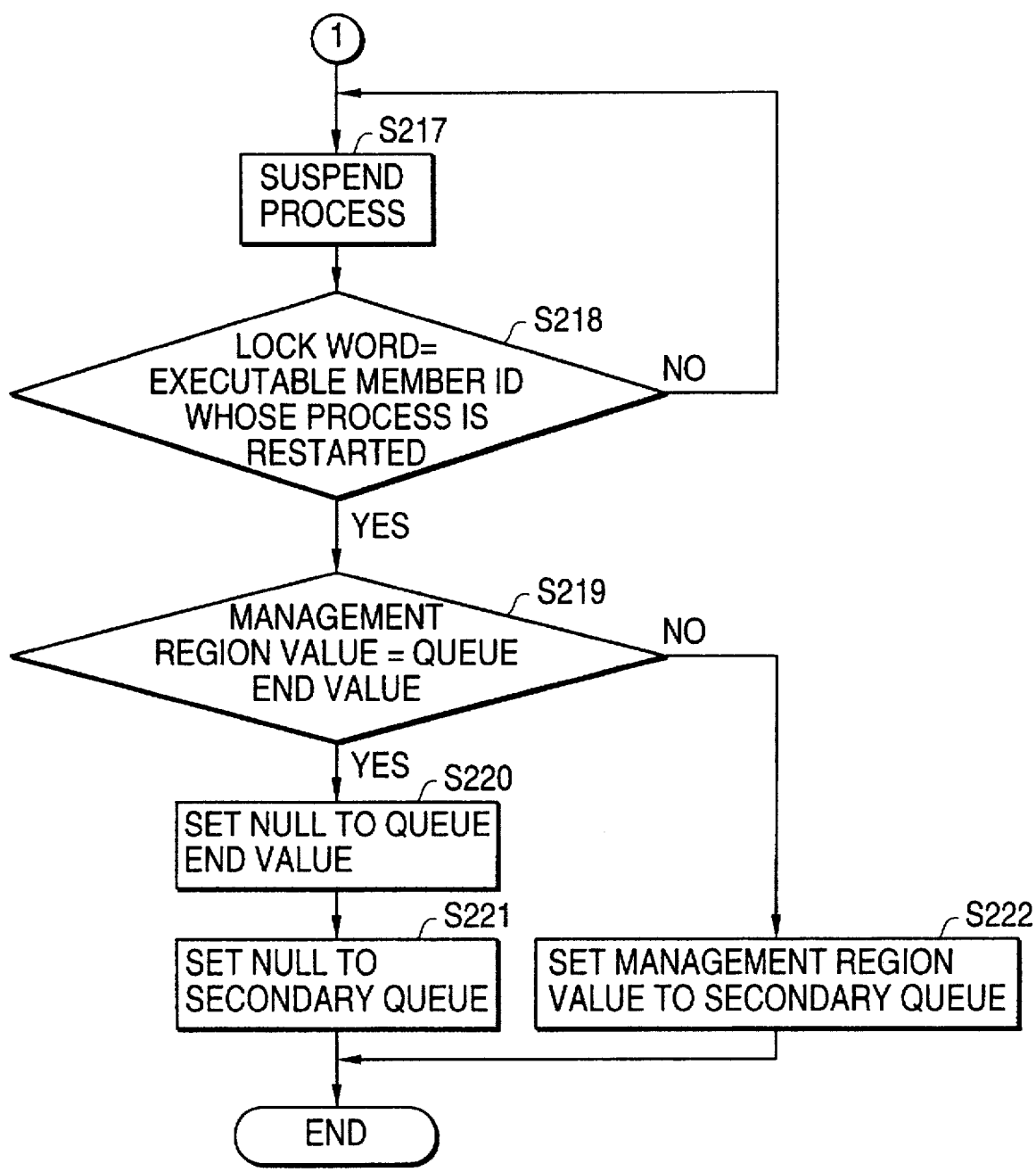
FIG. 3 is another flowchart for showing the process operation to acquire the use right.

Referring now to FIG. 3, a process operation in such a case that the value of the management region after the swapping operation is not equal to the initial value "NULL" at the above-explained step S203 will be described.

First, when the value of the management region is not equal to the initial value "NULL" after the swapping operation, it is indicated that the executable member under waiting condition is present, and thus the requesting executable member must be also set to the waiting condition. As a consequence, the lock process unit 3a requests the executable member control unit 4 to suspend the process operation of the requesting executable member (step S217).

Figure 5:
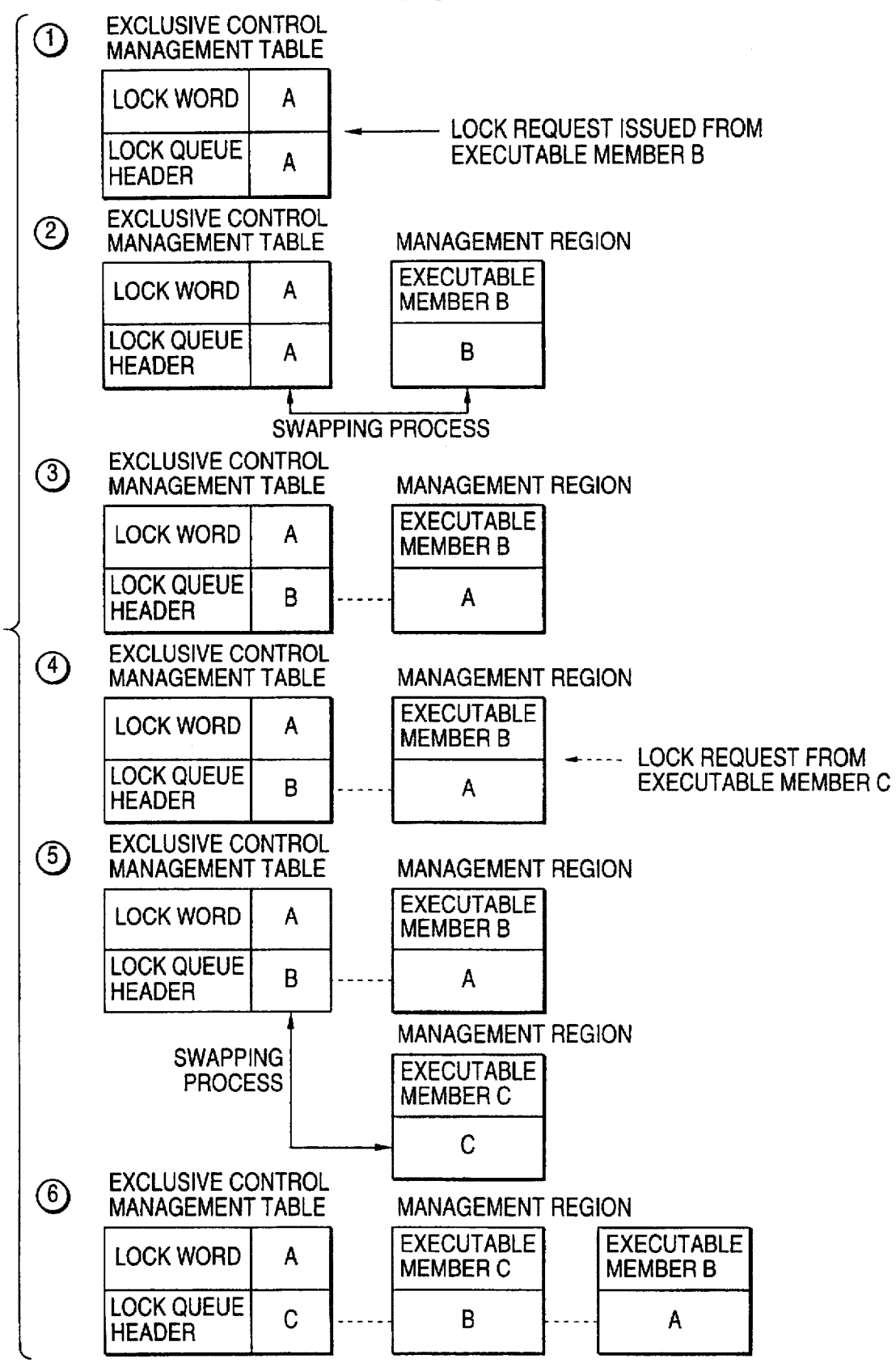
FIG. 5 illustrates an image of a queue forming process operation.

At this time, the executable member ID of the requesting executable member has been stored in the lock queue header region, whereas, to the management region 2a allocated to this requesting executable member, an executable member ID of an executable member that has requested to acquire the use right just before the requesting executable member. As a result, by referring to the value of the lock queue header region, the lock process unit 3a can judge such an executable member that has finally requested to acquire the use right. Furthermore, by referring to the management region allocated to this finally requesting executable member, the lock process unit 3a can judge such an executable member that has requested to acquire the use right immediately before this finally requesting executable member. Then, the executable member ID of the executable member that has acquired the use right has been stored into the management region 2a allocated to such an executable member that has firstly requested to acquire the use right among the executable members under waiting condition (see FIG. 5). In this embodiment, such a connection is used as the quasi-unidirectional queue.

Then, when the executable member that has already acquired the use right requests to realize the use right, the process operation is sequentially restarted from the executable member indicated in the lock queue header region. At this time, a comparison is made between the executable member ID of the executable member whose process operation is restarted, and the value of the lock word region (step S218). If this executable member ID is coincident with the value of the lock word region, another judgement is done as to whether or not the value of the management region 2a allocated to the executable member whose process operation is restarted is made coincident with the queue end value of the exclusive control management table 1a. In other words, it is judged as to whether or not there is an executable member under waiting state other than the executable member whose process operation is restarted (step S219).

Now, when the value of the management region 2a is coincident with the queue end value, it is judged that the executable member whose process operation is restarted corresponds to the last queue. Thus, the queue end value is reset to the initial value "NULL" (step S220), and also the secondary queue region is reset to the initial value "NULL" (step S221).

At the above-described step S219, when it is judged that there is the executable member under waiting state other than the executable member whose process operation is restarted, the value of the management region 2a allocated to the executable member whose process operation is restarted is set to the second queue region (step S222).

Figure 4:
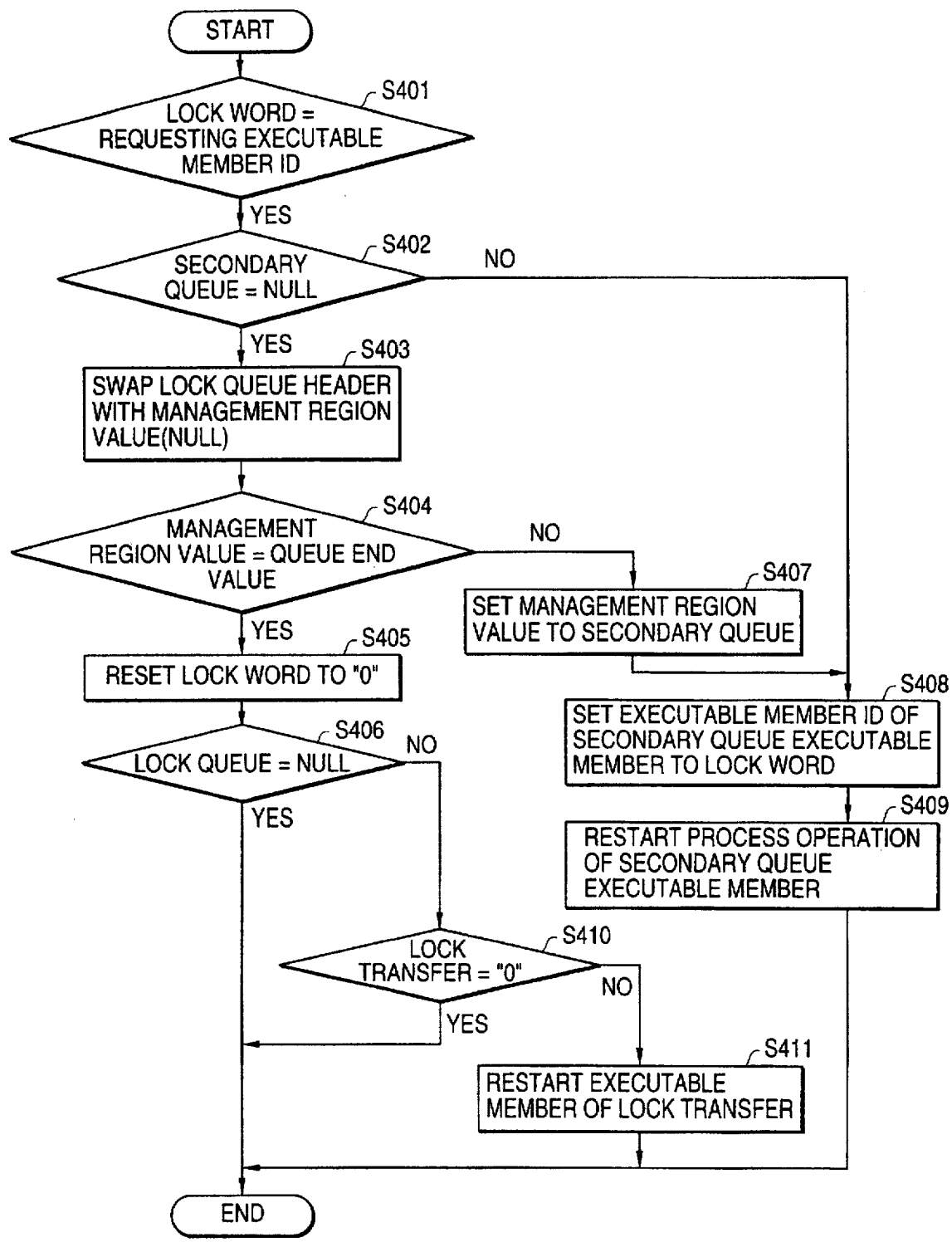
FIG. 4 is a flowchart for indicating a process operation to release the use right.

Referring now to a flow operation shown in FIG. 4, process operations of the unlock process unit 3b will be explained.

Upon receipt of the request to release the use right issued from the executable member that has acquired the use right, the unlock process unit 3b firstly compares the executable member ID of the requesting executable member with the executable member ID stored in the lock word region, and eliminates the request to release the use right issued from the executable member that has not acquired the use right (step S401).

Now, when the executable member ID of the requesting executable member is made coincident with the value of the lock word region, the unlock process unit 3b judges as to whether or not there is the secondary queue under waiting state with reference to the secondary queue region of the exclusive control management table 1a (step S402).

If there is no secondary queue, then the value (initial value "NULL") of the management region allocated to the requesting executable member is swapped for the value of the lock queue header region (step S403).

Then, the value of the management region after the swapping operation is compared with the queue end value of the exclusive control management table 1a. Now, if both these values are coincident with each other, then the unlock process unit 3b judges that there is no executable member under waiting state, and the initial value "0" is set to the lock word region of the exclusive control management table 1a (step S405).

Furthermore, in order to judge as to whether or not a request to acquire a use right by the interrupt process is issued during the above-described steps S403 to S405, the unlock process unit 3b judges as to whether or not the value of the lock queue header region of the exclusive control management table 1a remains as the initial value "NULL" (step S406).

If the value of the lock queue header region is equal to the initial value "NULL", then the process operation to release the use right is complete.

When the value of the secondary queue is not equal to the initial value "NULL" at the above-described step S402, namely no secondary queue is present, the executable member ID stored in the secondary queue region is set to the lock word region (step S408), and the unlock process unit 3b requests the executable member control unit 4 to restart the process operation of this requested executable member (step S409).

Furthermore, when the value of the management region 2a after the swapping operation is not coincident with the queue end value at the step S404, namely when the executable member under waiting state is present, these executable members are handled as the secondary queue, and then the value of the management region 2a after the swapping operation is set to the secondary queue region (step S407) so as to perform a process operation similar to that defined at the previous steps S408 and S409.

In the case that any value other than the initial value "NULL" is stored in the lock queue header region at the step S406, the unlock process unit 3b judges as to whether or not the request to acquire the use right by the interrupt process is issued with reference to the value of the lock transfer region of the exclusive control management table 1a (step S410). Now if the initial value "NULL" is set to the lock transfer region, then it is judged that no interrupt process is issued, and the process operation to release the use right is ended. When the executable member ID is set to the lock transfer region, the unlock process unit 3b judges that the request to acquire the use right by the interrupt process is issued, and then requests the executable member control unit 4 to restart the process operation of this executable member (step S411).

As previously explained, according to this embodiment 1, the quasi-unidirectional queue can be formed by employing only the swapping process. Then, it is possible to realize the exclusive control of the suspend lock system by utilizing the unidirectional queue.

Embodiment 2

An arrangement of an exclusive control management table 1a according to embodiment 2 of the present invention is represented in FIG. 6.

As indicated in FIG. 6, the exclusive control management table 1a is comprised of a lock word region, a lock queue header region, a secondary queue region, and a queue end value region.

An executable member ID of such an executable member that has acquired a use right of a shared resource is stored into the lock word region. When the use right of the shared resource is under empty state, an initial value "0" is set to the lock word region.

An executable member ID of such an executable member that has finally requested to acquire the use right among executable members which are under waiting conditions for acquiring the use right is stored into the lock queue header region. It should be noted that the use right of the shared resource is under empty state and also there is no executable member under waiting state, an initial value "NULL" is stored into this lock queue header region.

An executable member ID of an executable member that has finally requested to acquire a use right among secondary queues is stored into the secondary queue region.

When a certain executable member has acquired a use right, an executable member ID of this executable member is stored into the queue end value region.

Other arrangements of this embodiment 2 are similar to those of the above-explained embodiment 1, and therefore explanations thereof are omitted.

Figure 7:
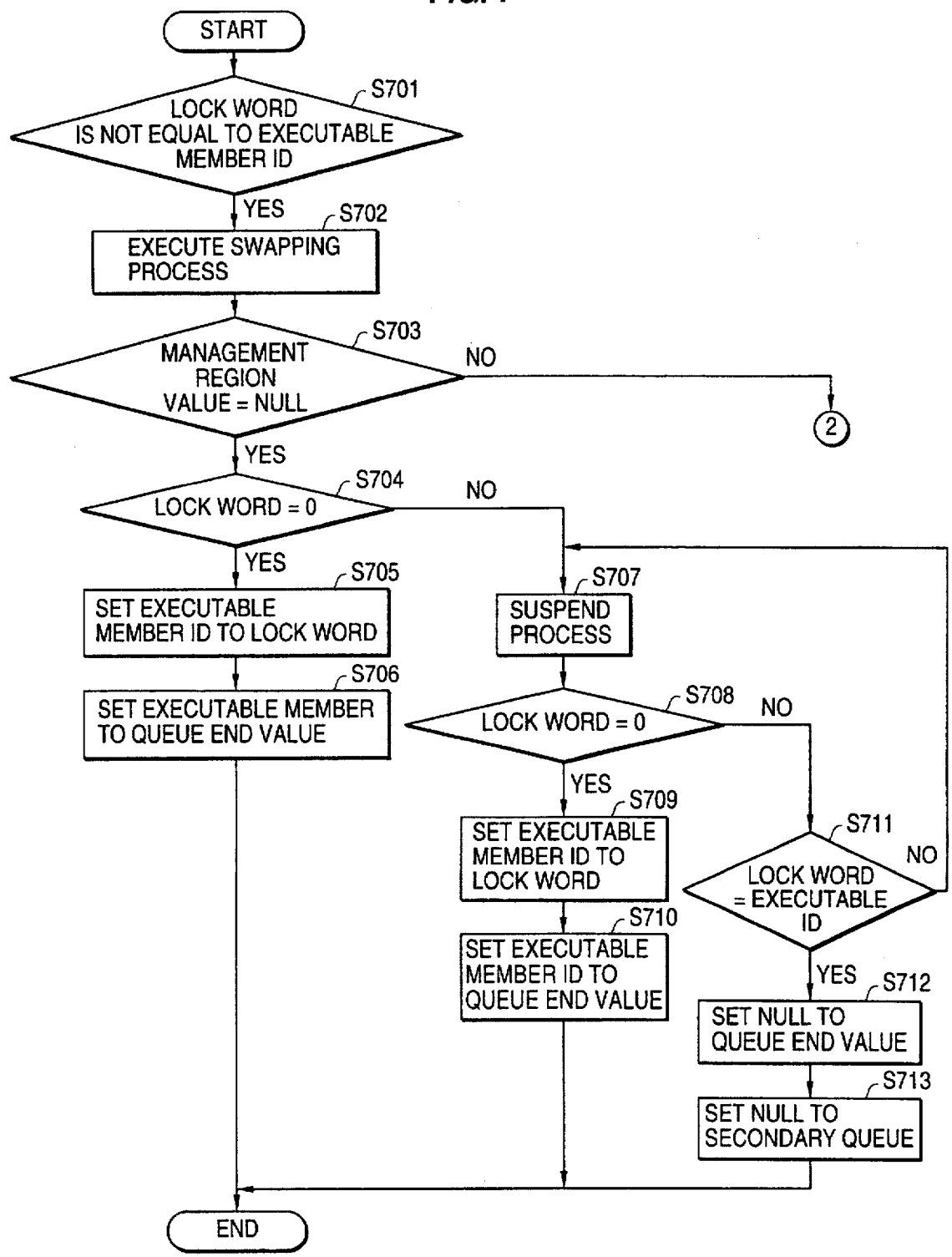
FIG. 7 is a flowchart for indicating a process operation to acquire a use right.
Figure 8:
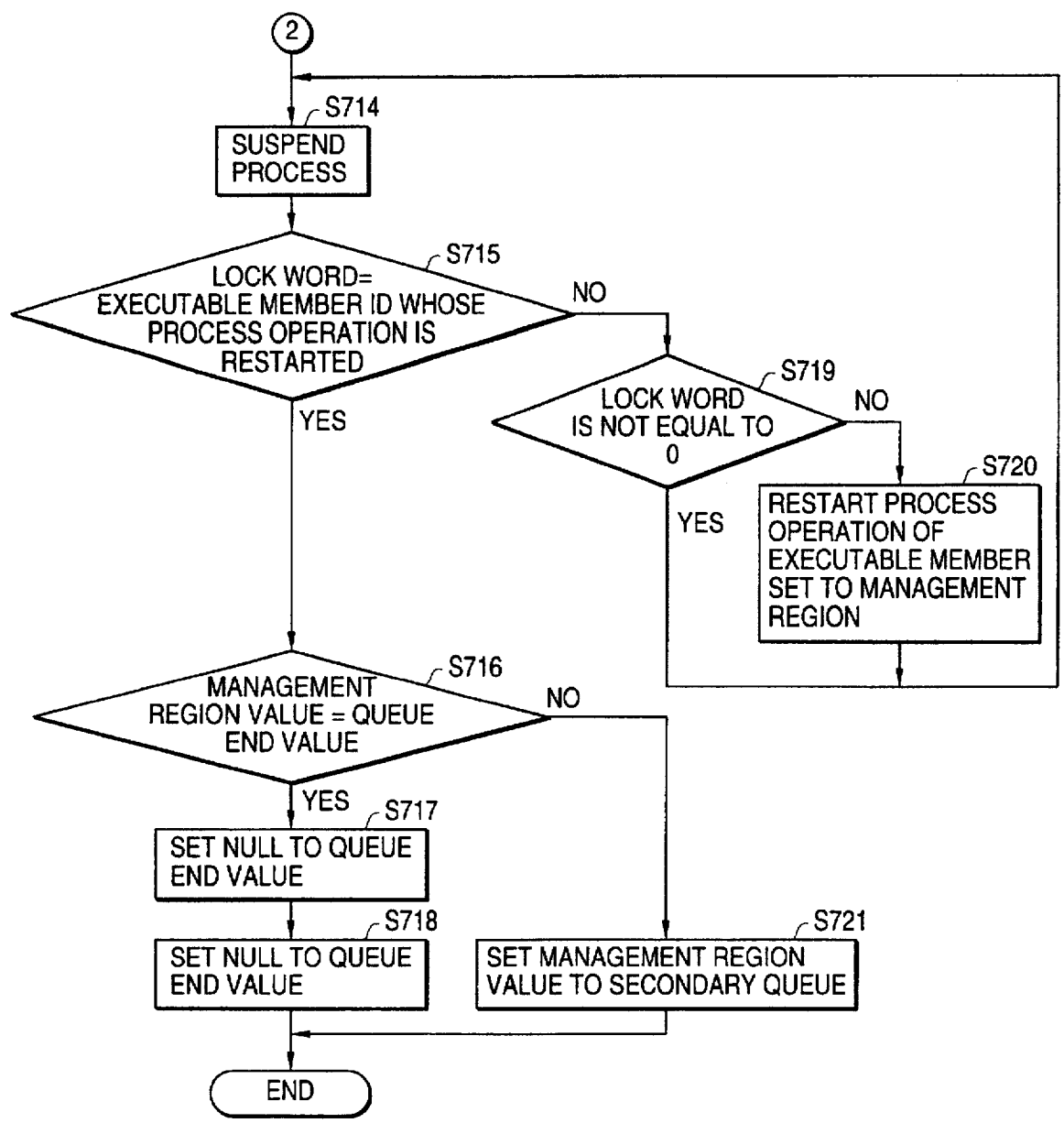
FIG. 8 is another flowchart for indicating the process operation to acquire the use right.

Referring now to a flow operation shown in FIG. 7, process operations of the lock process unit 3a will be described.

When the request to acquire the use right of the shared resource issued from a certain executable member together with the executable member ID of this executable member is received therefrom, the lock process unit 3a reads out the value of the lock word region from the exclusive control management table 1a of the memory 1. Then, the lock process unit 3a compares the read lock word value with the received executable member ID to thereby avoid to be acquired the use right in duplicate by a single executable member (step S701).

In this case, the lock process operation is continued only when the lock word value is not coincident with the executable member ID. That is, the value (executable member ID) of the management region 2a is swapped for the value of the lock queue header region of the exclusive control management table 1a (step S702).

Subsequently, the lock process unit 3a judges as to whether or not the value of the management region 2a after the swapping operation corresponds to the initial value "NULL" of the lock queue header region (Step S703).

Now, if the initial value of the lock queue header region is "NULL", then it is judged that there is no primary queue. Then, the lock process unit 3a judges as to whether or not the value of the lock word region of the exclusive control management table 1a is equal to "0" (step S704).

If the value of the lock word region is equal to "0", then it is judged that the use right is under empty state, Then, the lock process unit 3a sets the executable member ID of the requesting executable member to the lock word region (step S705).

At this time, the executable member ID of the requesting executable member is written into the queue end value region (step S706).

As a consequence, the requesting executable member has acquired the use right of the shared resource.

When the value of the lock word region is not equal to the initial value "0" at the above-described step S704, it is judged that the request to acquire the use right issued from the executable member corresponds to such an interrupt process issued while processing the release of the use right by another executable member, and then the lock process unit 3a requests the executable member control unit 4 to suspend the process operation of the requesting executable member (step S707).

When the process operation to release the use right of other executable member is ended, the lock process unit 3a requests the executable member control unit 4 to restart the process operation of the requesting executable member. At this case, a judgement is made as to whether or not the value of the lock word region in the exclusive control management table 1a is equal to the initial value "0" with reference to the value of the lock word region (step S708).

When the value of the lock word region is equal to the initial value "0", it is judged that the use right of the shared resource is under empty state, and the executable member ID of the requesting executable member is set to the lock word region (step S709).

Then, the executable member ID of the requesting executable member is registered into the queue end value region in the exclusive control management table 1a (step S710).

As a result, the requesting executable member has acquired the use right of the shared resource.

When the value of the lock word region is equal to any value other than the initial value at the above-explained step S708, the value of the lock word region is identified with the executable member ID of the requesting executable member (step S711). Now, when both these values are coincident with each other, the initial value "NULL" is reset to the queue end value (step S712), and the initial value "NULL" is reset to the secondary queue region (step S713).

In the case that the value of the lock word region is not coincident with the executable member ID of the requesting executable member at the above step S711, the process operations defined subsequent to the step S707 are repeatedly performed.

A description will now be made of process operation in such a case that the value of the management region 2a after the swapping operation is not equal to the initial value "NULL".

That is, when the value of the management region 2a after the swapping operation is not equal to the initial value "NULL", it is judged that the primary queue is present. Then, the lock process unit 3a requests the executable member control unit 4 to suspend the process operation of the requesting executable member (step S714). At this time, the requesting executable member is coupled to a head of the primary queue.

Then, when the executable member that has acquired the use right issues the request to release the use right, the primary queues are dequeued in a batched mode to become secondary queues. Thereafter, the process operations are sequentially restarted from an executable member locked at the head of the primary queues. At this time, the process operation of the requesting executable member is also restarted.

When the process operation of the requesting executable member is restarted, the value of the lock word region in the exclusive control management table 1a is identified with the executable member ID of the requesting executable member (step S715).

Now, if the executable member ID of the requesting executable member is stored in the lock word region, then the management region 2a allocated to the requesting executable member is identified with the queue end value region of the exclusive control management table 1a (step S716).

When the value of the management region 2a is coincident with the queue end value, it is judged that the requesting executable member corresponds to the last executable member of the secondary queue. Then, the initial value "NULL" is reset to the queue end value region of the exclusive control management table 1a (step S717), and the initial value "NULL" is reset to the secondary queue region (step S718). At this time, the requesting executable member can acquire the use right of the shared resource.

To the contrary, when the value of the management region 2a is not coincident with the queue end value at the above step S716, such a judgement is made that the executable member that has requested to acquire the use right prior to the requesting executable member is present in the secondary queue. Then, the executable member ID stored into the management region 2a allocated to the requesting executable member is set to the secondary queue region (step S721).

In the case that no executable member ID of the requesting executable member has been stored in the lock word region at the above step S715, a judgement is done as to whether or not the value of the lock word region is equal to the initial value "0" (step S719).

Now, if the value of the lock word region is any value other than the initial value, then the process operations defined subsequent to the above-explained step S714 are repeatedly performed. To the contrary, when the value of the lock word region is equal to the initial value "0", after the process operation of the executable member is restarted (step S720) which is indicated by the executable member ID set to such a management region 2a allocated to the requesting executable member, the process operations defined subsequent to the above-mentioned step S714 are repeatedly performed.

Figure 9:
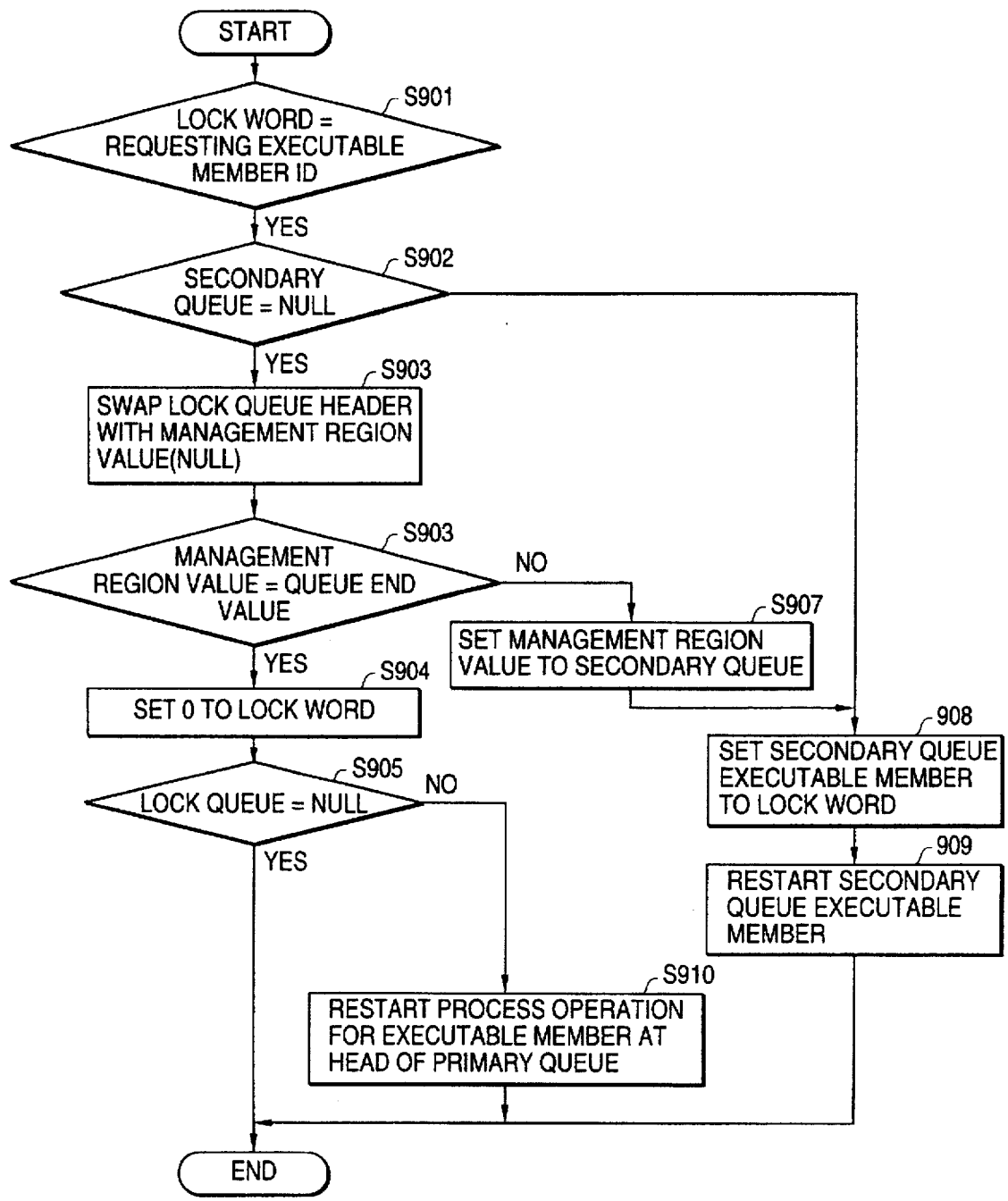
FIG. 9 is a flowchart for showing a process operation to release the use right.

Referring now to a flow operation shown in FIG. 9, process operations of the unlock process unit 3b will be explained.

Upon receipt of an executable member ID of an executable member and a request to release a use right issued from this executable member that has acquired the use right, the unlock process unit 3b firstly identifies the received executable member ID of this executable member with the executable member ID of the lock word region, and eliminates the request to release the use right issued from the executable member that has not acquired the use right (step S901).

Only when the executable member ID of the requesting executable member is made coincident with the value of the lock word region, the process operation is continued. That is, the unlock process unit 3b judges as to whether or not there is the secondary queue under waiting state with reference to the secondary queue region of the exclusive control management table 1a (step S902).

If there is no secondary queue (namely, if initial value "NULL" is set to secondary queue region), then the value (initial value "NULL") of the management region allocated to the requesting executable member is swapped for the value of the lock queue header region (step S903.).

Then, the value of the management region after the swapping operation is compared with the queue end value of the exclusive control management table 1a (step S904). Now, if both these values are coincident with each other, then the unlock process unit 3b judges that there is no primary queue, and the initial value "0" is set to the lock word region of the exclusive control management table 1a (step S905). At this time, the use right of the shared resource has been released.

Furthermore, in order to judge as to whether or not a request to acquire a use right by the interrupt process is issued during the above-described steps S903 and S905, the unlock process unit 3b judges as to whether or not the value of the lock queue header region of the exclusive control management table 1a remains as the initial value "NULL" (step S906).

If the value of the lock queue header region is equal to the initial value "NULL", then the process operation is accomplished. On the other hand, when the executable member ID of another executable member is stored into the lock queue header region, it is judged that the primary queue is formed by the interrupt process. Then, the process operation of the executable member at the head of the primary queue (namely, executable member that has finally requested to acquire use right)(step S910).

When the value of the secondary queue regions is not equal to the initial value "NULL" at the above step S902, the executable member ID set to the secondary queue region is set to the lock word region (step S908), and then the process operation of the secondary queue executable member is restarted (step S910).

Also, when the value of the management region 2a allocated to the requesting executable member is not coincident with the queue value, at the above step S904, after the executable member ID stored into the management region 2a is set to the secondary queue region (step S907), similar process operations to those of the steps S908 and S909 are carried out.

As previously described, according to this embodiment 2, a similar advantage to that of the previous embodiment 1 can be achieved even when the lock transfer region is not employed.

Embodiment 3

In this embodiment 3, a description will now be made of such a case that the process operation to release the use right is carried out by an interrupt prohibiting process operation. Since an arrangement of a computer system in this case is similar to that of the above-described embodiment 2, explanations thereof are omitted.

Figure 10:
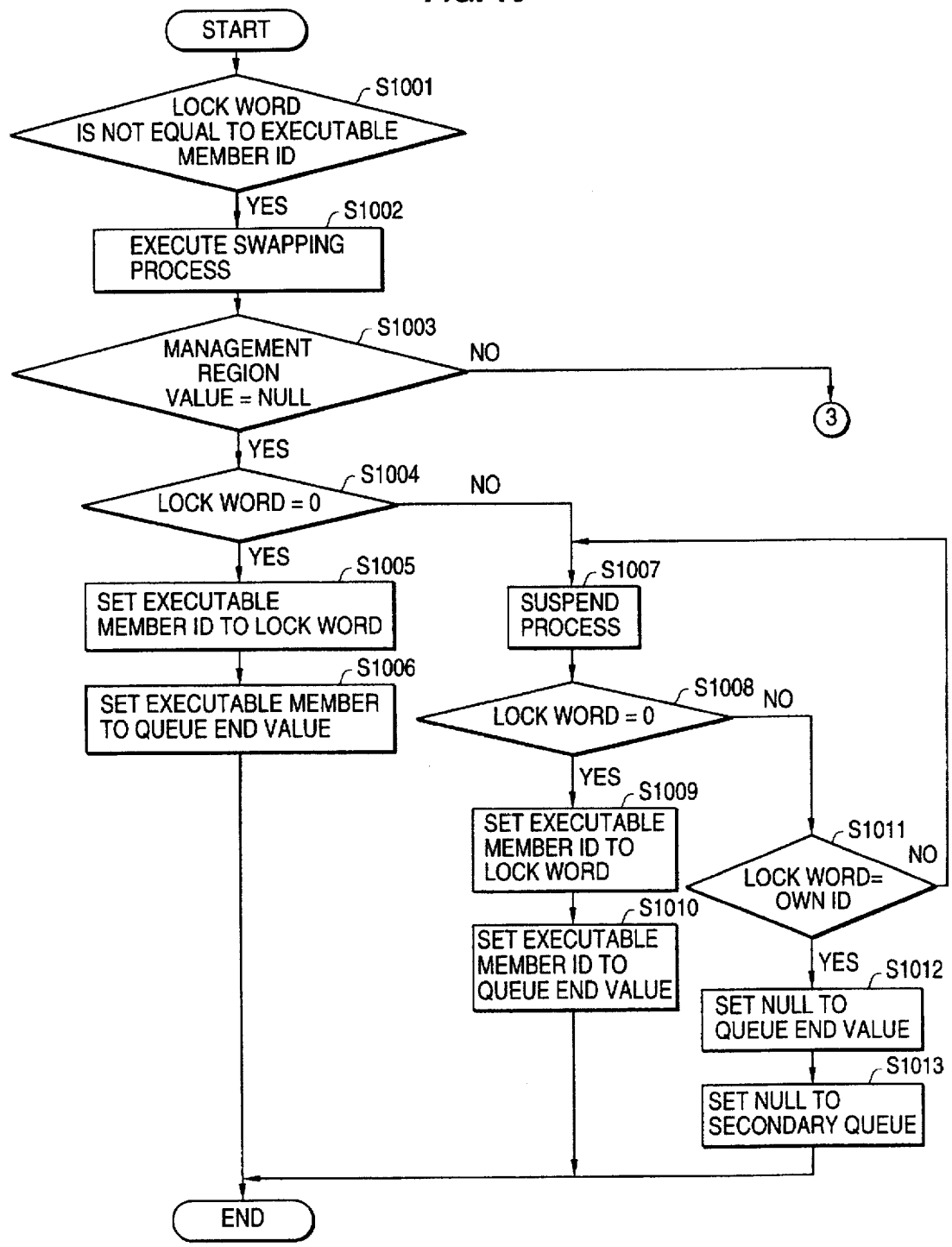
FIG. 10 is a flowchart for representing a process operation to acquire a use right.

Now, the process operation of the lock process unit 3a will be explained with reference to a flow operation of FIG. 10.

When the request to acquire the use right of the shared resource issued from a certain executable member together with the executable member ID of this executable member is received therefrom, the lock process unit 3a reads out the value of the lock word region from the exclusive control management table 1a of the memory 1. Then, the lock process unit 3a compares the read lock word value with the received executable member ID to thereby avoid that a single executable member will acquire the double use right (step S1001).

In this case, the lock process operation is continued only when the lock word value is not coincident with the executable member ID. That is, the value (executable member ID) of the management region 2a is swapped for the value of the lock queue header region of the exclusive control management table 1a (step S1002).

Subsequently, the lock process unit 3a judges as to whether or not the value of the management region 2a after the swapping operation corresponds to the initial value "NULL" of the lock queue header region (step S1003).

Now, if the initial value of the lock queue header region is "NULL", then it is judged that there is no primary queue. Then, the lock process unit 3a judges as to whether or not the value of the lock word region of the exclusive control management table 1a is equal to "0" (step S1004).

If the value of the lock word region is equal to "0", it is judged that the use right is under empty state. Then, the lock process unit 3a sets the executable member ID of the requesting executable member to the lock word region (step S1005).

At this time, the executable member ID of the requesting executable member is written into the queue end value region (step S1006).

As a consequence, the requesting executable member has acquired the use right of the shared resource.

When the value of the lock word region is not equal to the initial value "0" at the above-described step S1004, it is judged that the request to acquire the use right issued from the executable member corresponds to such an interrupt process issued while processing the release of the use right by another executable member, and then the lock process unit 3a requests the executable member control unit 4 to suspend the process operation of the requesting executable member (step S1007).

When the process operation to release the use right of another executable member is ended, the lock process unit 3a requests the executable member control unit 4 to restart the process operation of the requesting executable member. At this case, a judgement is made as to whether or not the value of the lock word region in the exclusive control management table 1a is equal to the initial value "0" with reference to the value of the lock word region (step S1008).

When the value of the lock word region is equal to the initial value "0", it is judged that the use right of the shared resource is under empty state, and the executable member ID of the requesting executable member is set to the lock word region (step S1009).

Then, the executable member ID of the requesting executable member is registered into the queue end value region in the exclusive control management table 1a (step S1010).

As a result, the requesting executable member has acquired the use right of the shared resource.

When the value of the lock word region is equal to any value other than the initial value at the above-explained step S1008, the value of the lock word region is identified with the executable member ID of the requesting executable member (step S1011). Now, when both these values are coincident with each other, the initial value "NULL" is reset to the queue end value (step S1012), and the initial value "NULL" is reset to the secondary queue region (step S1013).

Figure 11:
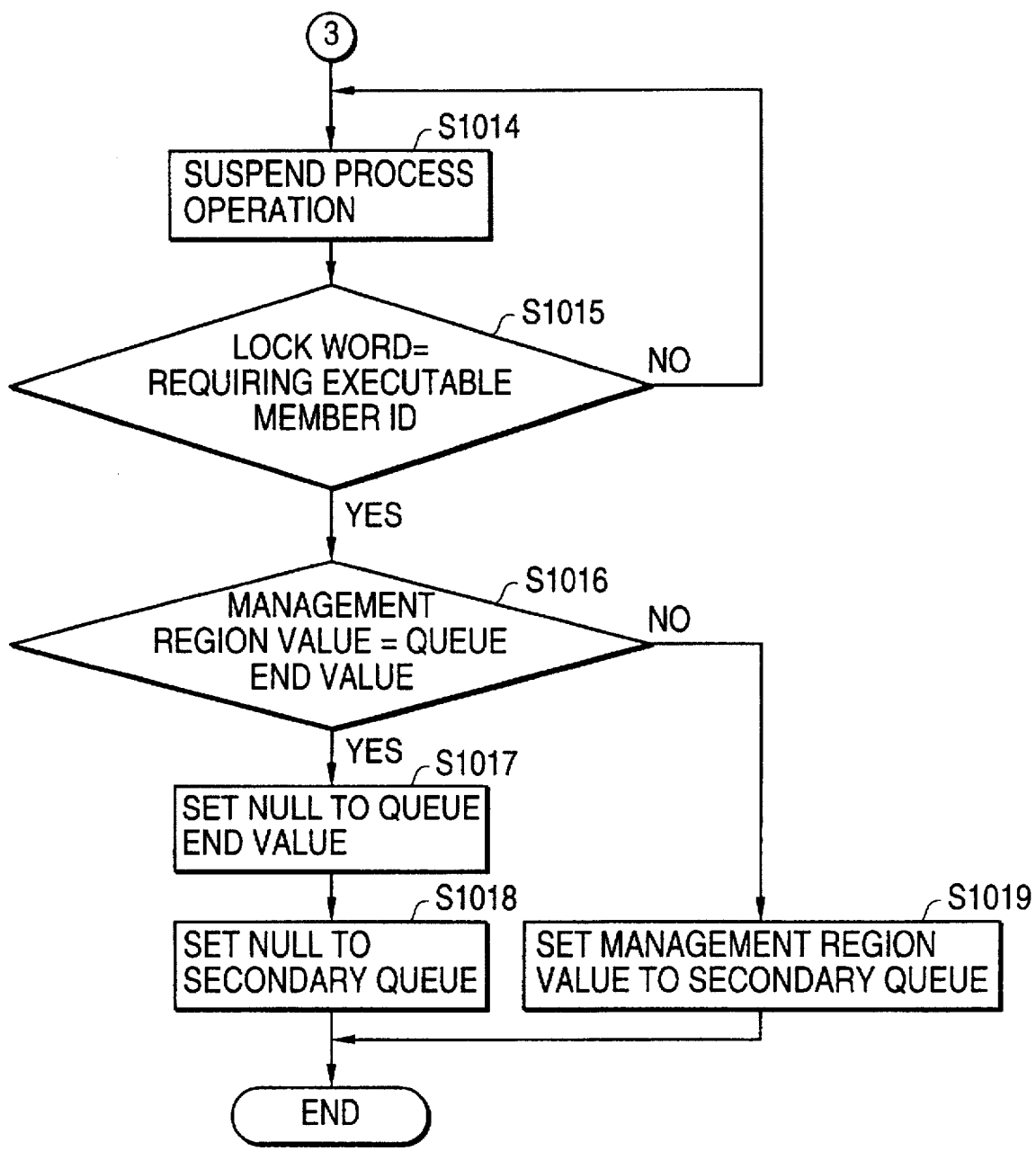
FIG. 11 is another flowchart for representing the process operation to acquire the use right.

Now, a description will be made of process operations in such a case that the value of the management region 2a allocated to the requesting executable member is not equal to the initial "NULL" at the above step S1003 with reference to FIG. 11.

First, when the value of the management region is not equal to the initial value "NULL" after the swapping operation, it is indicated that the executable member under waiting condition is present, and thus the requesting executable member must be also set to the waiting condition. As a consequence, the lock process unit 3a requests the executable member control unit 4 to suspend the process operation of the requesting executable member (step S1014).

At this time, the executable member ID of the requesting executable member has been stored in the lock queue header region, whereas, to the region 2a allocated to this requesting executable member, the executable member ID of the executable member that has requested to acquire the use right just before has been stored.

Then, when the executable member that has already acquired the use right requests to release the use right, the process operation is sequentially restarted from the executable member indicated in the lock queue header region. At this time, a comparison is made between the executable member ID of the executable member whose process operation is restarted, and the value of the lock word region (step S1015). If this executable member ID is coincident with the value of the lock word region, another judgement is done as to whether or not the value of the management region 2a allocated to the executable member whose process operation is restarted is made coincident with the queue end value of the exclusive control management table 1a. In other words, it is judged as to whether or not there is an executable member under waiting state other than the executable member whose process operation is restarted (step S1016).

Now, when the value of the management region 2a is coincident with the queue end value, it is judged that the executable member whose process operation is restarted corresponds to the last queue. Thus, the queue end value is reset to the initial value "NULL" (step S1017), and also the secondary queue region is reset to the initial value "NULL" (step S1018).

At the above-described step S1016, when it is judged that there is the executable member under waiting state other than the executable member whose process operation is restarted, the value of the management region 2a allocated to the executable member whose process operation is restarted is set to the second queue region (step S1019).

Referring now to a flow operation shown in FIG. 12, process operations of the unlock process unit 3b will be explained.

Upon receipt of an executable member ID of an executable member and a request to release a use right issued from this executable member that has acquired the use right, the unlock process unit 3b compares the received executable member ID of this executable member with the executable member ID of the lock word region, and eliminates the request to release the use right issued from the executable member that has not acquired the use right (step S1201).

Only when the executable member ID of the requesting executable member is made coincident with the value of the lock word region, the process operation is continued. That is, the unlock process unit 3b judges as to whether or not there is the secondary queue under waiting state with reference to the secondary queue region of the exclusive control management table 1a (step S1202).

If there is no secondary queue (namely, if initial value "NULL" is set to the secondary queue region), then the value (initial value "NULL") of the management region allocated to the requesting executable member is swapped for the value of the lock queue header region (step S1203).

Then, the value of the management region after the swapping operation is compared with the queue end value of the exclusive control management table 1a (step S1204). Now, if both these values are coincident with each other, then the unlock process unit 3b judges that there is no primary queue, and the initial value "0" is set to the lock word region of the exclusive control management table 1a (step S1205). At this time, the use right of the shared resource has been released.

When the value of the secondary queue region is not equal to the initial value "NULL" at the above step S1202, it is judged that the secondary queue is present. At this time, the executable member ID that has been set to the secondary queue region is set to the lock word region (step S1207). Furthermore, the unlock process unit 3b requests the executable member control unit 4 to restart the process operation of the executable member of the secondary queue (step S1208).

On the other hand, when the value of the management region 2a allocated to the requesting executable member is not coincident with the queue end value in the above step S1204, after the executable member ID stored into the management region 2a is set to the secondary queue region (step S1206), similar operations to those of the above-explained steps S1207 and S1208 are performed.

Figure 12:
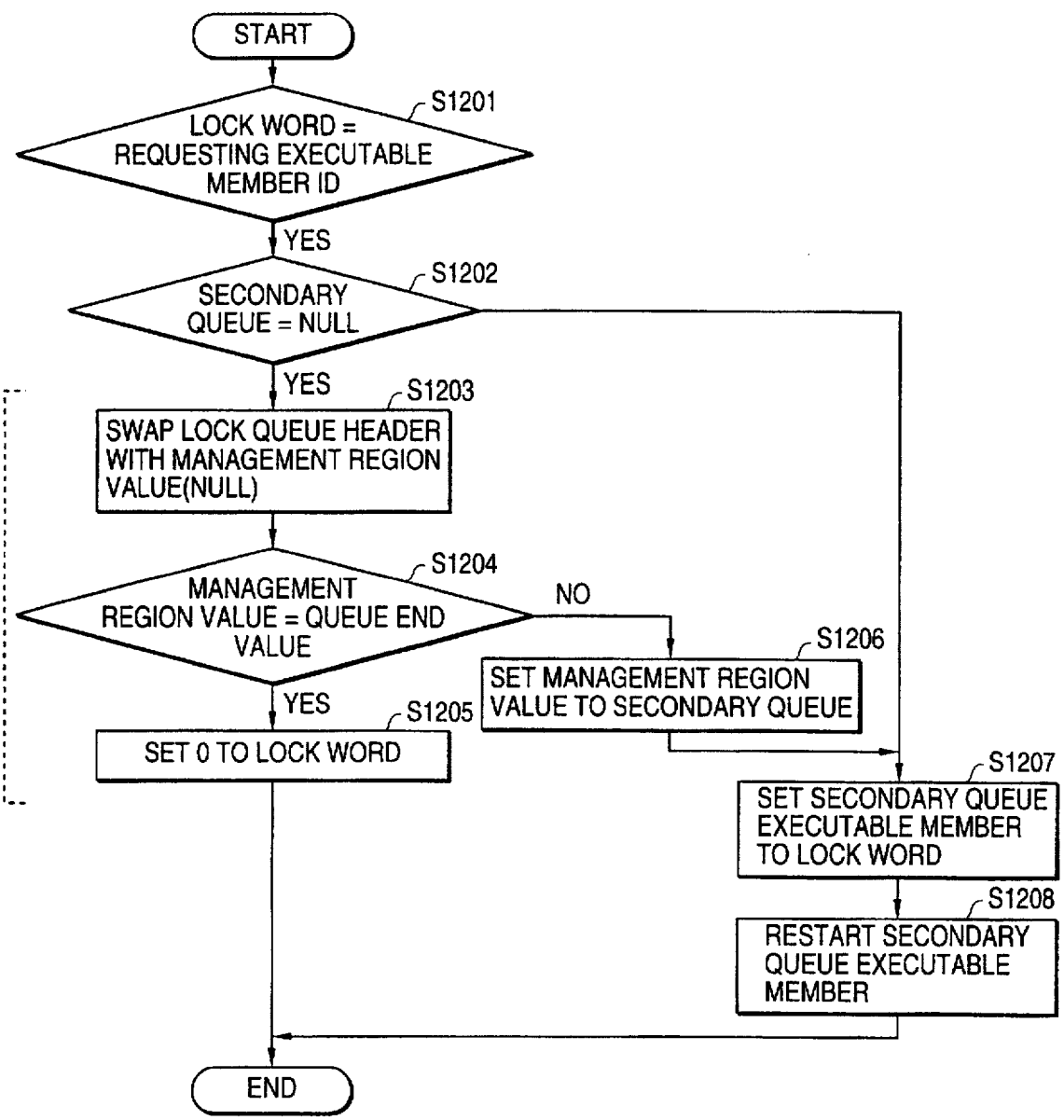
FIG. 12 is a flowchart for showing a process operation to release the use right.

As previously described, in accordance with this embodiment 3, the process operations defined from the step S1203 up to the step S1205 shown in FIG. 12 are executed as the interrupt prohibiting process operation, so that a similar effect to that of the above-described embodiment 1, or embodiment 2 can be achieved.

What is claimed is:

1. An exclusive control system of a shared resource in a computer system where a plurality of executable members are executed in a parallel manner, comprising:

an exclusive control management table constructed of a lock word and a lock queue header, said lock word storing therein executable member identifying information for specifying an executable member that has acquired a use right of the shared resource, and said lock queue header storing therein executable member identifying information of such an executable member that has finally requested to acquire the use right of the shared resource among executable members that have requested to acquire the use right while another executable member acquires the use right;

a management region allocated to each of said executable members, for storing therein each executable member identifying information of the allocated executable member;

resource management means for swapping a content of a management region allocated to a requesting executable member for a content of the lock queue header of said exclusive control management table upon receipt of the request to acquire the use right of said shared resource from the executable member, or a request to release the use right from the executable member, thereby producing a quasi-queue for chaining the executable members that have requested to acquire the use right while another executable member acquires the use right; and executable member control means for suspending a process operation of such an executable member which is brought into a waiting state in order to acquire the use right of said shared resource, and for restarting the process operation of the executable member when the executable member under waiting state has acquired the use right.

2. The exclusive control system of a shared resource as claimed in claim 1, wherein said resource control means includes:

means for swapping the executable member identifying information stored in the management region allocated to said executable member for a value stored in the lock queue header of said exclusive control management table upon receipt of the request to acquire the use right of said shared resource from said executable member;

means for judging as to whether or not the swapped value of the management region is equal to an initial value of the lock queue header;

means for judging as to whether or not an executable member identifying information of another executable member has been stored in the lock word of said exclusive control management table in the case that the value of said management region is equal to the initial value of said lock queue header;

means for writing the executable member identifying information of the requesting executable member for acquiring the use right into said lock word if the executable member identifying information of another executable member is not stored into said lock word; and means for notifying an instruction to suspend the process operation of said executable member to said executable member control means in the case that the value of said management region is not equal to the initial value of the lock queue header.

3. The exclusive control system of a shared resource as claimed in claim 1, wherein said resource management means includes:

means for swapping, upon receipt of a request to release said use right issued from the executable member that has acquired the use right of the shared resource, a value stored in a management region allocated to said executable member for the value stored in said lock queue header;

means for judging as to whether or not the swapped value of the management region indicates the executable member identifying information of said requesting executable member;

means for resetting said lock word when said swapped value of the management region indicates the executable member identifying information of the requesting executable member;

means for judging that an executable member under waiting condition is present when said swapped value of the management region indicates an executable member identifying information of another executable member, and also means for setting the executable member identifying information of another executable member to said lock word;

means for requesting said executable member control means to restart the process operation of the another executable member;

means for judging as to whether or not a value of a management region allocated to said executable member whose process operation is restarted indicates the executable member identifying information of the requesting executable member;

means for judging, when the value of the management region allocated to said executable member whose process operation is restarted indicates the executable member identifying information of the requesting executable member, that said executable member whose process operation is restarted corresponds to such an executable member that has firstly requested to acquire the use right among said executable members under waiting condition; and means for judging, when the value of the management region allocated to the executable member whose process operation is restarted indicates an executable member identifying information of such an executable member different from said requesting executable member, that there is another executable member that has requested to acquire the use right before said executable member whose process operation is restarted.

4. The exclusive control system of a shared resource as claimed in claim 3, wherein said exclusive control management table further comprises a lock transfer region for registering therein an executable member identifying information of an executable member that has requested to acquire the use right while performing the process operation to release the use right; and said resource management means further includes:

means for judging, when said process operation to release the use right is accomplished, as to whether or not there is such an executable member that has requested to acquire the use right while performing the process operation to release the use right with reference to said lock transfer region; and means for requesting said executable member control means to restart the process operation of the executable member if there is the executable member that has requested to acquire the use right.

5. The exclusive control system of a shared resource as claimed in claim 3, wherein said resource management means further includes:

means for judging, when said process operation to release the use right is accomplished, as to whether an initial value has been set, or an executable member identifying information has been set by again referring to the lock queue header of the executable control table; and means for judging, when the executable member identifying information is set to said lock queue header, that there is the executable member that has requested to acquire the use right while performing said process operation to release the use right, and also means for requesting said executable member control means to restart the process operation of said executable member specified by said executable member identifying information.

6. The exclusive control system of a shared resource as claimed in claim 3, wherein said resource management means executes said process operation to release the use right by way of an interrupt prohibit process operation.

* * * * *